S. S. COLT.
HOLDING OR TYING MEANS FOR MOLDING APPARATUS.
APPLICATION FILED JULY 28, 1921.

1,424,880.

Patented Aug. 8, 1922.
3 SHEETS—SHEET 1.

INVENTOR:
Samuel S. Colt,
BY
Braentzel and Richards,
ATTORNEYS.

S. S. COLT.
HOLDING OR TYING MEANS FOR MOLDING APPARATUS.
APPLICATION FILED JULY 28, 1921.
1,424,880.
Patented Aug. 8, 1922.
3 SHEETS—SHEET 2.
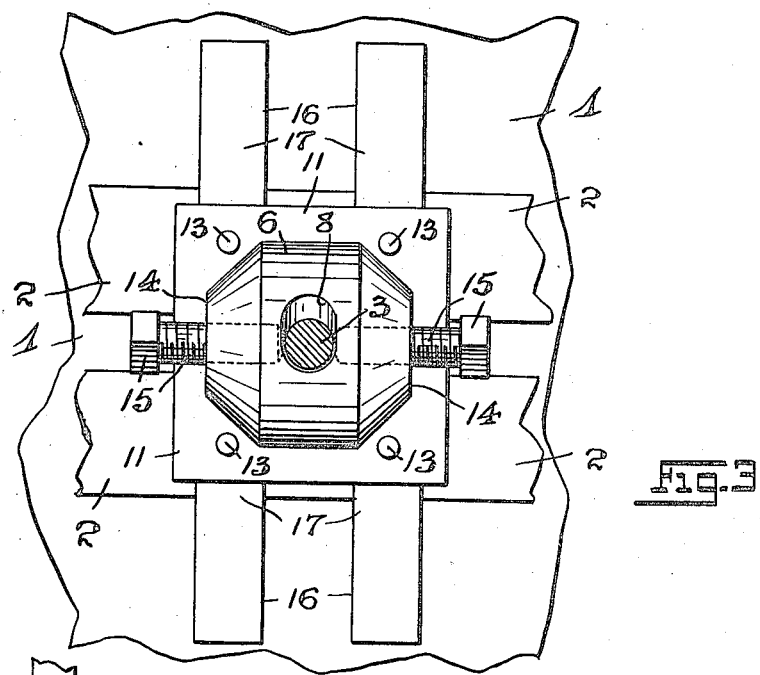
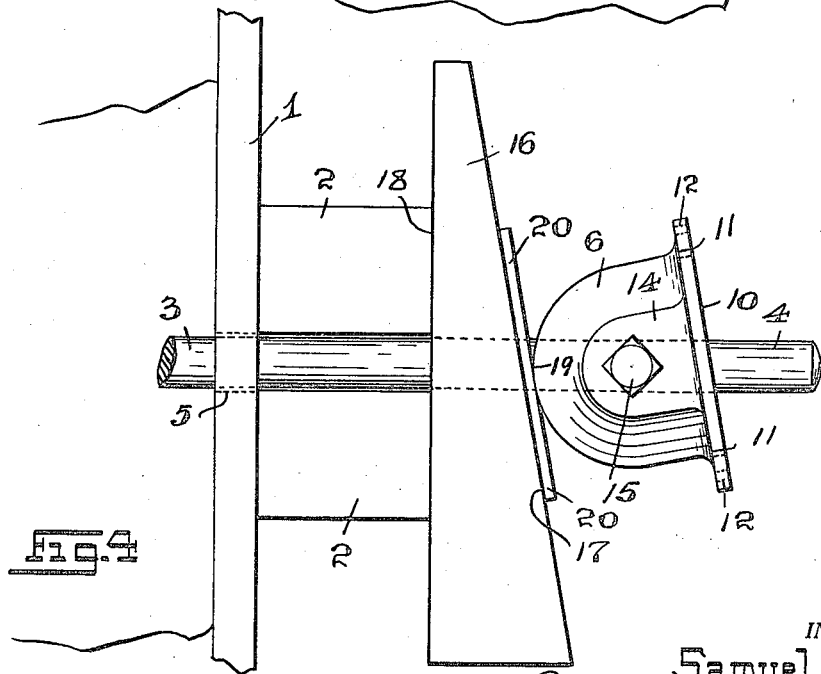
INVENTOR:
Samuel S. Colt,
BY
Fraentzel and Richards,
ATTORNEYS.

S. S. COLT.
HOLDING OR TYING MEANS FOR MOLDING APPARATUS.
APPLICATION FILED JULY 28, 1921.
1,424,880.
Patented Aug. 8, 1922.
3 SHEETS—SHEET 3.
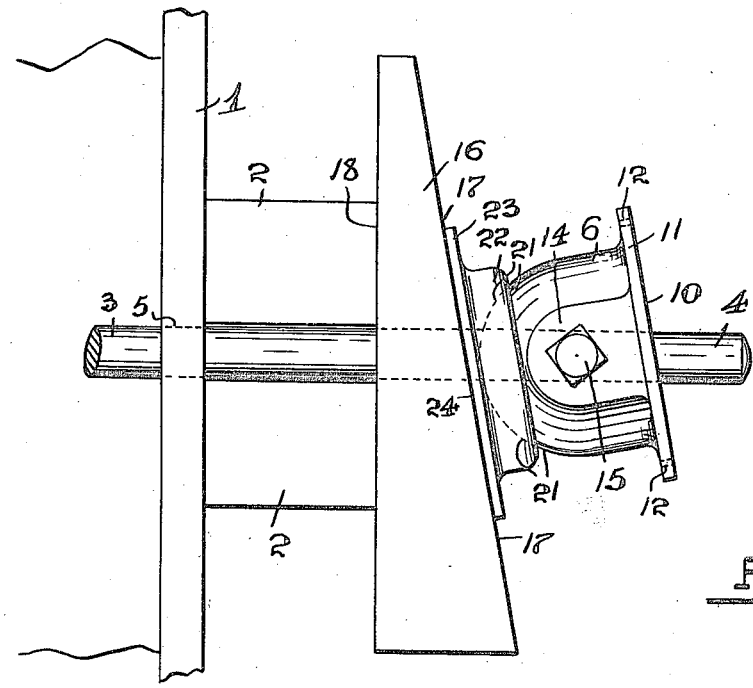
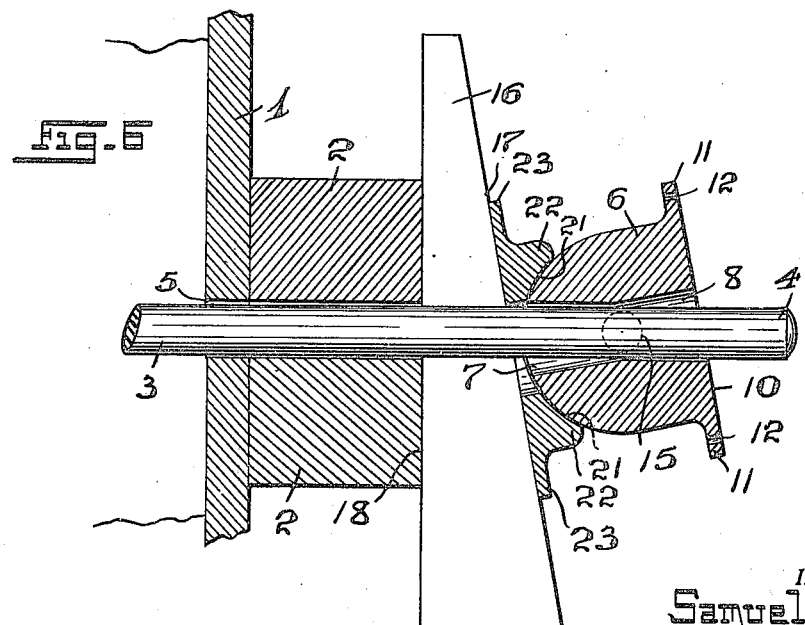
INVENTOR:
Samuel S. Colt,
BY
Fraentzel and Richards,
ATTORNEYS.

UNITED STATES PATENT OFFICE.

SAMUEL S. COLT, OF ORANGE, NEW JERSEY.

HOLDING OR TYING MEANS FOR MOLDING APPARATUS.

1,424,880.　　　　　Specification of Letters Patent.　　Patented Aug. 8, 1922.

Application filed July 28, 1921. Serial No. 488,056.

*To all whom it may concern:*

Be it known that I, SAMUEL S. COLT, a citizen of the United States, residing at Orange, in the county of Essex and State of New Jersey, have invented certain new and useful Improvements in Holding or Tying Means for Molding Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally to improvements in molding apparatus employed in concrete construction; and the invention has reference more particularly, to improved devices to be used with the cribbing and retaining members or elements used to provide a form for producing or molding therein a concrete structure, or the like.

The present invention has for its principal object to provide a novel and simply constructed holding or securing means, comprising in connection therewith an arrangement of adjustable alining elements which may be variously employed for holding and securing in properly alined relation the various members of a cribbing or form, and providing a tying means which can be readily removed from the poured structure when it is necessary to disconnect and take down the several members of the cribbing or form.

The invention has for its further object to provide a novel holding and tying means for the proper adjustment and disposition of the mold-boards or cribbing members and the usual board retaining members used in connection therewith, said means comprising in connection with the usual tie-rod, or similar elements ordinarily employed, suitably constructed wedge-engaging elements which are adjustably and oscillatorily mounted upon said tie-rods or elements, but are adapted to be secured in fixed positions upon said tie-rods or elements for the reception of wedges to be driven in place so as to secure the several cribbing or mold-elements in properly alined relation to produce a smooth-faced wall or other structure, and one of uniform thickness.

Other objects of the present invention not at this time more particularly enumerated will be clearly understood from the following detailed description of the present invention.

With the various objects of the present invention in view, the said invention consists, primarily, in the novel holding and tying means for a cribbing or molding apparatus; and, the said invention consists, furthermore, in the novel arrangements and combinations of the various devices and parts, as well as in the details of the construction of the said parts, all of which will be more fully described in the following specification, and then finally embodied in the clauses of the claim which are appended to and which form an essential part of said specification.

The present invention is clearly illustrated in the accompanying drawings, in which:—

Figure 3 is a detail face-view of the said devices and parts, looking in the direction of the arrow $x$ in said Figure 2, the tie-rod being represented in cross-section.

Figure 4 is a view of the several devices and parts, similar to Figure 1, but showing a modified arrangement of the said devices and parts.

Figure 5 is another view of the several devices and parts, similar to Figure 1, said view illustrating another modified construction of oscillating wedge-engaging and tying element; and Figure 6 is a vertical sectional representation of the several devices and parts illustrated in said Figure 5.

Similar characters of reference are employed in the said above described views, to indicate corresponding parts.

Figure 1:
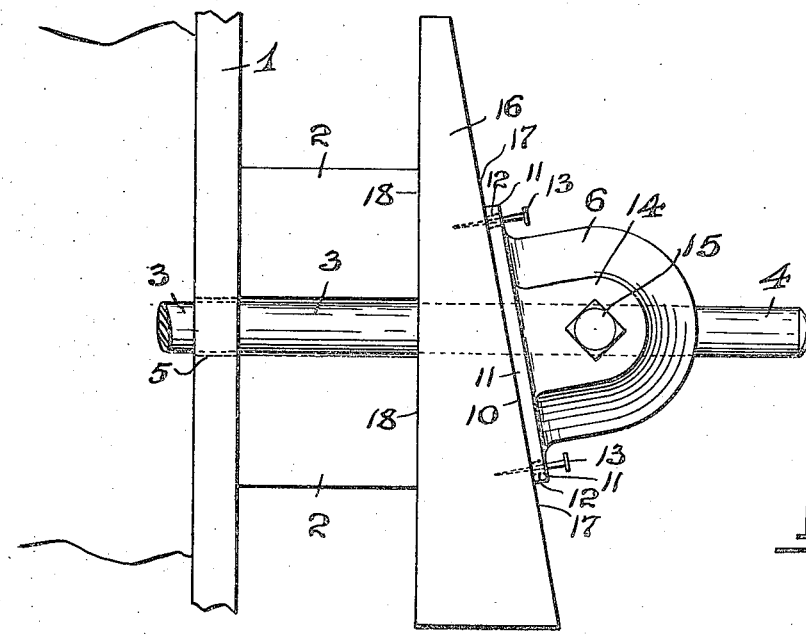
Figure 1 is a view, showing in elevation fragmentary portions of one of the cribbing-walls, a pair of stringer-elements, a portion of one of the tie-rods or members extending beyond and from the outer face of the cribbing-wall, and having mounted thereon, an oscillating wedge-engaging holding or tying means, showing one embodiment of the principles of the present invention.

Referring now to the several figures of the drawings, the reference-character 1 indicates a fragmentary portion of one of the cribbing-walls of a mold-form of any suitable size, against the outer face of which are arranged the usual horizontal stringer-pieces or elements 2. The reference-character 3 indicates one of the usual tie-rods or members extending across the space of the form, from face to face, as is usual, each tie-rod or member 3 having a portion 4 which projects through a hole or opening 5 in the cribbing wall 1, said portion 4 extending between and beyond the stringer-pieces or elements 2, for the arrangement upon said projecting portion 4, of an oscillatory wedge-engaging holding and tying means made according to and embodying the principles of the present invention.

Figure 2:
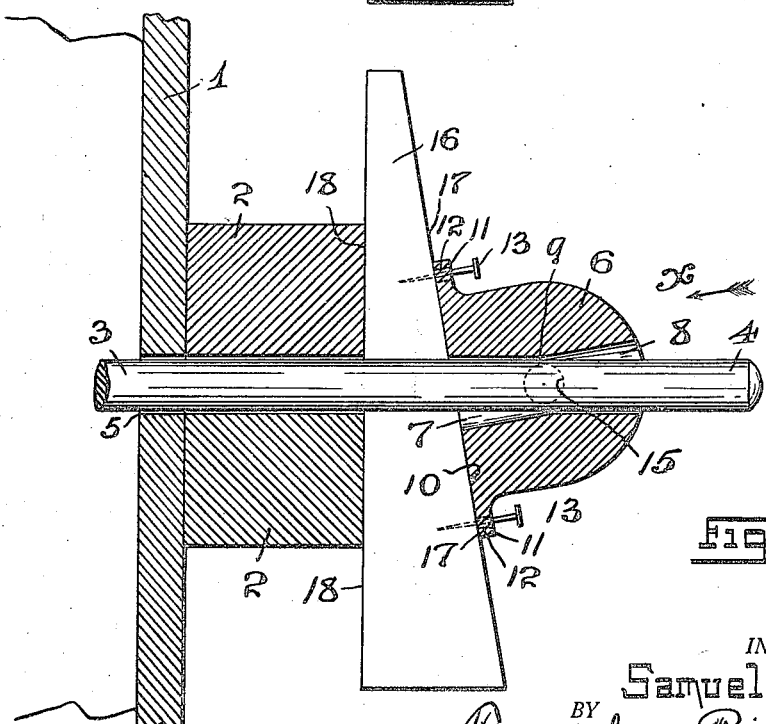
Figure 2 is a vertical sectional representation of the several devices and parts illustrated in said Figure 1.

Referring now more particularly to Figures 1, 2 and 3 of the drawings, this wedge-engaging holding and tying means, consists, essentially, of a casting 6 in the form of a block, of any suitable configuration, said block being formed with duct-portions or openings, as 7 and 8, substantially in the form of truncated cones, said duct-portions at their smallest cross-section meeting at 9; substantially as shown in Figure 2 of the drawings, and for the arrangement of the said block in an oscillatory manner upon the projecting portion of the said tie-rod or member 3.

The said tubular body or block 6 is formed with a flat base or surface-portion 10, preferably surrounded by a flange 11, also preferably provided with holes or perforations 12 for the reception of nails 13 for the purposes to be presently set forth. In its opposite sides 14, the said tubular body or block 6 is provided with screw-threaded sockets for the reception of set-screws 15, said sockets being located in alinement with the plane of the smallest cross-section of the duct-portions 7 and 8, located at 9, said set-screw being adapted to be screwed into firm holding engagement with the tie-rod or element 3, to prevent any movement of the said holding or tying devices upon the portion 4 of the rod 3, after the proper adjustment of the device for the reception of a pair of wedges 16 has been made.

The manner of using the tying block 6, in connection with the various devices of the mold-form and with the inclined surface 17 of the wedges will be clearly understood from an inspection of the drawings. Thus, when the tying block 6 has been properly adjusted upon the portion 4 of the tie-rod or member 3, and secured by means of the set-screws 15 in a fixed position against sliding upon the tie-rod, a pair of said wedges, with their surfaces 18 against the stringer-pieces 2 and with their inclined surfaces 17 against the flat base or surface-portion 10 of the tying block 6, are forcibly driven in place, the oscillating feature of the tying block 6, permitting the latter to readily accommodate itself to the inclined surfaces 17 of the said wedges, so that the various devices and parts will be firmly tied and securely locked in their assembled relation. As an extra precaution the set-screws can be given another turn or two, to doubly secure the locked or held position of the tying block upon the portion 4 of the rod 3, as will be evident. To guard against any possible slipping of the wedges, nails 13 may be inserted in the receiving holes or perforations 12 and driven into the wedges, as shown in said Figures 1, 2 and 3 of the drawings.

In some cases, as is shown in Figure 4 of the drawings, the tying block may be reversed upon the portion 4 of the tie-rod 3, a perforated disk or plate, as 20, being placed upon said rod 3, between the surfaces 17 of the wedges 16 and the curved surface-portion 19 of the said block or casting 6. The adjustment of the block 6 upon the rod 3, and the manner of securing the same in its fixed position thereon by means of the set-screws, is the same as that described in connection with Figures 1, 2 and 3 of the drawings.

If desired, in lieu of the shape of tying block 6 shown and described in connection with said Figures 1 to 4 inclusive, a block formed with a spherical surface-portion, as 21, may be employed, this spherical surface being oscillatorily disposed in the dished surface 22, surrounded by a flange 23, of a perforated disk or plate 24, substantially as shown in Figures 5 and 6 of the drawings. The operation of the said tying block will be clearly understood from an inspection of said last-mentioned figures, its adjustment and the manner of securing the block in fixed position upon the portion 4 of the tie-rod 3 being the same as that described hereinbefore in connection with said Figures 1, 2, 3 and 4 of the drawings.

While in the foregoing description I have set forth the use of my novel holding or tying means in connection with a cribbing or mold-form such as is used in the production of concrete walls and similar structures, it will be understood that the said holding or tying means is capable of other uses where it is necessary to properly tie and aline different members or elements with relation to one another.

I am also fully aware that changes may be made in the general arrangements and combination of the various devices and parts as well as in the details of the construction of the same, without departing from the scope of the present invention as set forth in the foregoing specification and as defined in the clauses of the claim which are appended thereto. Hence, I do not limit my present invention to the exact arrangements and combinations of the various devices and parts as described in the said specification, nor do I confine myself to the exact details of the construction of the said parts, as illustrated in the accompanying drawings.

I claim:—

1. In a form or cribbing for use in the erection of concrete and similar structures, in combination with a cribbing wall, a stringer-piece, and a tying rod, a holding or tying means oscillatorily mounted upon said rod, said means being provided with a wedge-engaging surface, and a wedge movable upon said wedge-engaging surface for bringing the assembled elements into holding alinement.

2. In a form or cribbing for use in the erection of concrete and similar structures, in combination with a cribbing wall, a stringer-piece, and a tying rod, a holding or tying means oscillatorily mounted upon said rod, said means being provided with a wedge-engaging surface, set-screws connected with said holding or tying means for securing the same primarily in its oscillatory relation upon said tying rod and secondarily in its fixed position upon said rod, and a wedge movable upon the wedge-engaging surface of said holding or tying means for bringing the assembled elements into holding alinement.

3. In a form or cribbing for use in the erection of concrete and similar structures, in combination with a cribbing wall, a stringer-piece, and a tying rod, a holding or tying means comprising a block formed with oppositely located and truncated cone-shaped ducts for oscillatorily mounting said block upon said rod, said block being provided with a wedge-engaging surface, means connected with said block for securing the same in a fixed position upon said rod, and a wedge movable upon said wedge-engaging surface for hinging the assembled elements into holding alinement.

4. In a form or cribbing for use in the erection of concrete and similar structures, in combination with a cribbing wall, a stringer-piece, and a tying rod, a holding or tying means comprising a block formed with oppositely located and truncated cone-shaped ducts for oscillatorily mounting said block upon said rod, said block being provided with a wedge-engaging surface, set-screws connected with said block for securing the same primarily in its oscillatory relation upon said tying rod and secondarily in its fixed position upon said rod, and a wedge movable upon the wedge-engaging surface of said block for bringing the assembled elements into holding alinement.

5. In a form or cribbing for use in the erection of concrete and similar structures, in combination with a cribbing wall, a stringer-piece, and a tying rod, a holding or tying means comprising a block formed with oppositely located and truncated cone-shaped ducts for oscillatorily mounting said block upon said rod, said block being provided with a wedge-engaging surface, means connected with said block for securing the same in a fixed position upon said rod, and a wedge movable upon said wedge-engaging surface for bringing the assembled elements into holding alinement, said block being further provided with nail-receiving perforations, and nails inserted in said perforations and driven into said wedge.

6. In a form or cribbing for use in the erection of concrete and similar structures, in combination with a cribbing wall, a stringer-piece, and a tying rod, a holding or tying means comprising a block formed with oppositely located and truncated cone-shaped ducts for oscillatorily mounting said block upon said rod, said block being provided with a wedge-engaging surface, set-screws connected with said block for securing the same primarily in its oscillatory relation upon said tying rod and secondarily in its fixed position upon said rod, and a wedge movable upon the wedge-engaging surface of said block for bringing the assembled elements into holding alinement, said block being further provided with nail-receiving perforations, and nails inserted in said perforations and driven into said wedge.

7. A wedge-engaging holding or tying element comprising a tubular body, the tubular portion being of a truncated cone-shaped configuration for oscillatorily mounting said element upon a rod.

8. A wedge-engaging holding or tying element comprising a tubular body, the tubular portion being of a truncated cone-shaped configuration for oscillatorily mounting said element upon a rod, said body being further provided with a nail-receiving perforation.

9. A wedge-engaging holding or tying element comprising a tubular body, the tubular portion being of a truncated cone-shaped configuration for oscillatorily mounting said element upon a rod, said body being further provided with a flat wedge-engaging surface and a surrounding marginal flange, said flange being provided with nail-receiving perforations.

10. A wedge-engaging holding or tying element comprising a body provided with oppositely disposed truncated cone-shaped duct-portions for oscillatorily mounting said element upon a rod.

11. A wedge-engaging holding or tying element comprising a body provided with oppositely disposed truncated cone-shaped duct-portions for oscillatorily mounting said element upon a rod, said body being further provided with a nail-receiving perforation.

12. A wedge-engaging holding or tying element comprising a body provided with oppositely disposed truncated cone-shaped duct-portions for oscillatorily mounting said element upon a rod, said body being further provided with a flat engaging surface and a surrounding marginal flange, said flange being provided with nail-receiving perforations.

13. A wedge-engaging holding or tying element comprising a body provided with oppositely disposed truncated cone-shaped duct-portions, and set-screws extending from the opposite sides of said body, for oscillatorily mounting said element upon a rod.

14. A wedge-engaging holding or tying element comprising a body provided with oppositely disposed truncated cone-shaped duct-portions, and set-screws extending from the opposite sides of said body, for oscillatorily mounting said element upon a rod, said body being further provided with a nail-receiving perforation.

15. A wedge-engaging holding or tying element comprising a body provided with oppositely disposed truncated cone-shaped duct-portions, and set-screws extending from the opposite sides of said body, for oscillatorily mounting said element upon a rod, said body being further provided with a flat wedge engaging surface and a surrounding marginal flange, said flange being provided with nail-receiving perforations.

In testimony, that I claim the invention set forth above I have hereunto set my hand this 26th day of July, 1921.

SAMUEL S. COLT.

Witnesses:
FREDK. C. FRAENTZEL,
EVA E. DESCH.